Figure 1:
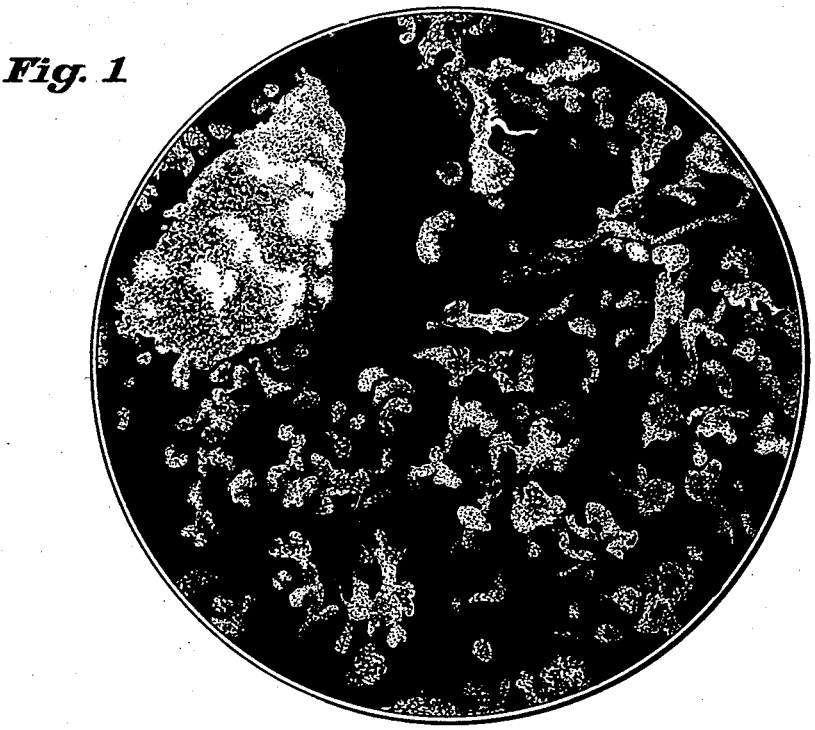

Carlton L. Crane
INVENTOR.

May 13, 1952     C. L. CRANE     2,596,656
METHOD OF PRECIPITATING HIGH ACETYL CELLULOSE ACETATE
Filed March 6, 1951     2 SHEETS—SHEET 2

Carlton
L. Crane
INVENTOR.
ATTORNEYS

Patented May 13, 1952

2,596,656

UNITED STATES PATENT OFFICE 2,596,656

METHOD OF PRECIPITATING HIGH ACETYL CELLULOSE ACETATE

Carlton L. Crane, Rochester, N. Y., assignor to Eastman Kodak Company, Rochester, N. Y., a corporation of New Jersey Application March 6, 1951, Serial No. 214,170

7 Claims. (Cl. 260—230)

This invention relates to a method of precipitating high acetyl cellulose acetate involving the use of a high temperature during the addition of the water employed to destroy the anhydride and in completing the neutralization of the catalyst of the esterification mass, and reverse precipitation under controlled high temperature conditions.

The precipitation of high acetyl cellulose acetate presents many problems which are not encountered in the precipitation of the ordinary acetone-soluble type of hydrolyzed cellulose acetate. This is especially evidenced in attempts to dissolve high acetyl cellulose acetate. In most cases when high acetyl cellulose acetate, ordinarily referred to as cellulose triacetate, is contacted with a solvent therefor to form a solution, considerable time of agitation is necessary before a complete solution is obtained. This appears to be due both to the characteristic of cellulose triacetate forming a horn-like product, and also the lack of porosity in the usual type of cellulose triacetate precipitate.

One disclosure in the prior art related to the precipitation of cellulose triacetate is found in Malm and Crane Patent No. 2,469,395, and the present invention represents an improvement over the method which was described in that previous patent. In the method as described in the Malm and Crane patent, after the esterification had been completed there was then added thereto aqueous acid to convert any remaining acetic anhydride to acid. This addition was made while the temperature was held at 120° F. after the catalyst had been neutralized. This procedure, while giving a stable product, required a certain amount of aging in order to give that stability. By my invention I have found that this time of aging may be dispensed with in the obtaining of a stable product. Most of the other precipitation methods found in the prior art refer to the precipitation of acetone-soluble cellulose esters and the problem of obtaining a readily soluble product was not met with therein.

One object of my invention is to provide a method of precipitating high acetyl cellulose acetate whereby a product is obtained which is readily susceptible to the action of solvents therefor, as compared with previously prepared high acetyl cellulose acetate. Another object of my invention is to provide a method of preparing high acetyl cellulose acetate in powder form in which considerations of economy are found. A further object of my invention is to prepare a precipitate of high acetyl cellulose acetate having a high bulk density. A still further object of my invention is to provide a method for obtaining a high acetyl cellulose acetate in which no reduction of acetyl is experienced at the completion of the acetylation and the obtaining of the finished product. A yet further object of my invention is to provide a high acetyl cellulose acetate which is heat stable. Other objects of my invention will appear herein.

In its broadest aspects my invention involves the treatment of the cellulose ester from the time that the acetylation thereof is completed until the product is obtained in the form of a finely divided precipitate. My invention applies to cellulose acetates having an acetyl content of at least 42%.

My invention involves in one of its forms first adjusting the sulfuric acid content of the completed esterification mixture so that there is present therein .20–1.75 parts of sulfuric acid per 100 parts of the cellulose which was employed as the starting material. In some cases the amount of catalyst used in the esterification is such that no partial neutralization of the sulfuric acid with a basic magnesium compound is carried out so that .20–1.75 parts of sulfuric acid per 100 parts of cellulose is present. There is then added to the mass water to destroy the anhydride therein (glacial point) and not beyond a point at which not more than 3% of the acid in the bath is water. This may be done, for instance, by subjecting the bath to treatment with a predetermined amount of steam over a 15–60 minute period while raising the temperature progressively from 80–120° F. (the usual temperature of an esterification mixture) to 140–190° F., so that the glacial point is reached or slightly exceeded. Instead of this, the mass may be brought to the glacial point or slightly beyond by the addition of aqueous acetic acid of 79–95% concentration. The temperature of the esterification mass increases while the water is added because of several effects, all of which are present. One of the contributing factors to this rise in temperature is the use of steam, or if aqueous acid is employed, an acid having a temperature of 180–212° F. Another factor which contributes to the rise in temperature is the heat generated by completely converting the acetic anhydride in the bath to acetic acid. A third factor contributing to the rise in temperature of the mass is the application of external heat to the vessel in which the mixing is carried out. It is desirable to carry out the mixing operation in a jacketed vessel, to which heat is contributed by the use of hot water or steam in the jacket.

After the mass has been brought to or slightly beyond the glacial point and the temperature thereof has been raised to 140°–190° F., the free sulfuric acid present therein is then completely neutralized with a basic magnesium compound such as magnesium carbonate, magnesium acetate, magnesia, or the like, while maintaining the elevated temperature. The amount of basic magnesium compound added at this point should be sufficient for complete neutralization of the sulfuric acid present, and in practice 5–10% excess thereof is ordinarily added to assure complete neutralization. After the catalyst is completely neutralized, the cellulose ester present is separated from the liquid mass in the manner which is described herein while maintaining the mass at the elevated temperature of 140–190° F.

A modification of the above may be carried out by mixing together the neutralizing agent and the aqueous acetic acid, heating this mixture to 190–212° F., and adding it to the completed esterification mass over a period of 15–60 minutes accompanied by raising the temperature progressively from 80–120° F. to 140–190° F. In this case the acetic acid which is used contains 5–21% of water based on the aqueous acid in an amount which brings the esterification mass to the glacial point or slightly beyond. The amount of magnesium compound which is employed is sufficient to completely neutralize the sulfuric acid present in the esterification mass, plus 5–10% excess thereof.

The precipitation is carried out by adding sufficient water to the mass to lower the concentration of acetic acid therein finally to 33–50% while agitating the same. The water which is to be added is weighed out and heated to a temperature of 180–212° F. and this water is uniformly added to the agitated mass over a period of 30–120 minutes. At the end of this time the precipitation is completed. The precipitation may be carried out at different speeds of agitation, this not being critical. For instance, if desired, the precipitation could be carried out in a sigma-blade equipped mixer such as agitated at a rate of 80–100 R. P. M. On the other hand, the precipitation can be carried out at a more rapid degree of agitation, for example, in a turbo mixer in which the agitator is running at a rate of 200–220 R. P. M.

The physical characteristics of the precipitate obtained by the described method are such that the products wash and drain easily after the precipitation has been completed. The precipitated solid settles out and is separated from the liquid, washed well with distilled water, and dried at an elevated temperature.

The process in accordance with my invention is susceptible to economical operation in view of the fact that the esterification mass can be brought to approximately the glacial or anhydrous acid point by means of steam without the adding of any further acid being necessary. Also the precipitation is carried out by the addition of water as such, so that any use of additional acetic acid at that point is thereby avoided. The high acetyl cellulose acetate prepared in accordance with my invention is also characterized by a high heat stability. The product of processes in accordance with my invention is also characterized by a physical form where water or solvent can readily penetrate the particles thereof, making possible extreme ease in washing and rapidity of dissolving in solvents.

For example, in comparing products prepared in accordance with my invention with those prepared by prior art processes, the dissolving of cellulose acetate prepared in accordance with my invention in methylene chloride-methyl alcohol was completed in approximately 2 hours as compared with a time of 8 hours for completely dissolving in a similar solvent mixture a high acetyl cellulose acetate prepared by prior art processes.

Another feature of the cellulose acetate prepared in accordance with my invention is that such material exhibits a high bulk density and therefore is more suitable for packaging even than products which are available at the present time. Also the product prepared as described exhibits a fair degree of uniformity as affirmed by the absence of dust. When examined under a microscope, the particles prepared as described exhibit a rough surface and in a cross section view show striations which would appear to be the reason why washing and solution are facilitated, whereas other particles of high acetyl cellulose acetate show under the microscope an almost uniformly smooth surface, and would be expected to be much less susceptible to the action of solvents and water or other liquid used for washing or for dissolving the cellulose ester.

Figure 2:
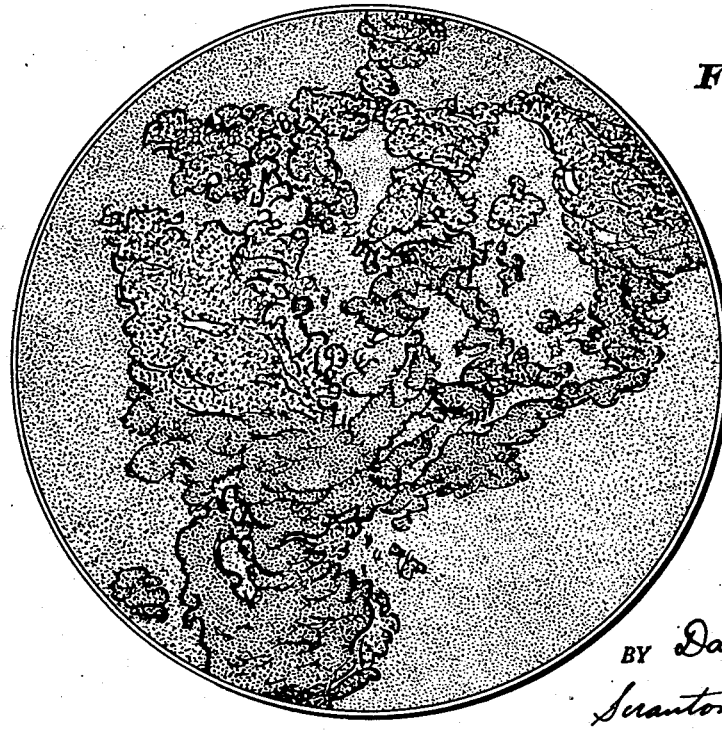
Figure 3:
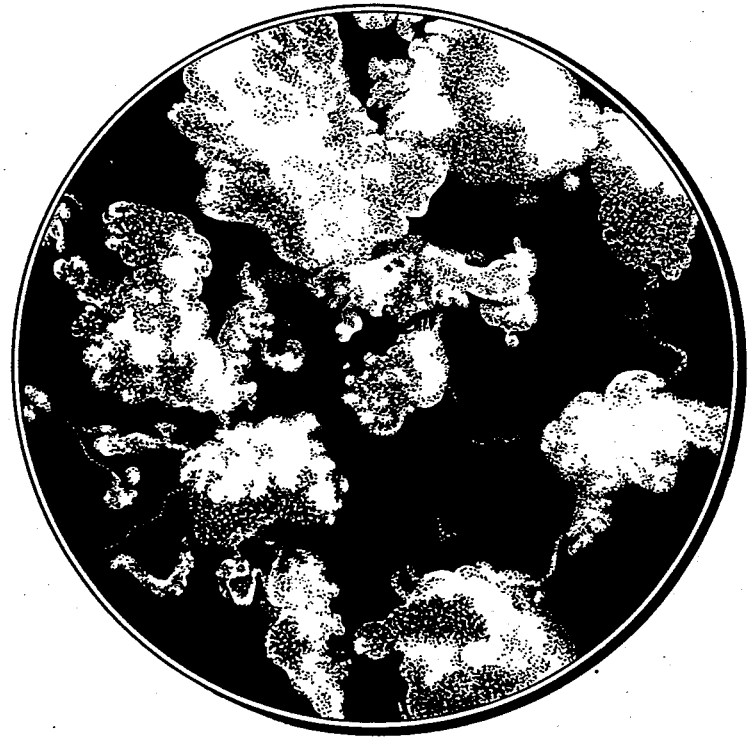

The drawings attached hereto illustrate the cellulose triacetate product prepared in accordance with my invention as compared to the cellulose acetate product which is ordinarily prepared at the present time. Figure 1 is a 33× magnification of the product obtained in accordance with the methods described herein. Figure 2 is a 200× magnification of particles of my precipitated cellulose triacetate. These figures show the nature of the product obtained in accordance with my invention, and illustrate the broken surface of the particles making for ease of washing and ease of dissolving, and also the striated condition of this precipitate. As regards the large particle in Figure 1, that large particle consists of a number of fine particles loosely held together; and needs only a slight touch to disintegrate it into a number of the fine particles as shown. Figure 3 is a 33× magnification of cellulose triacetate as produced commercially at the present time. The smooth surface of the particles is to be noted, which contributes to the difficulty of washing and dissolving that product.

The following examples illustrate my invention:

*Example 1.*—7.25 pounds of refined acetylation-grade cotton linters containing 0.25 pound of water were placed in a sigma blade-type mixer together with 28 pounds of glacial acetic acid. The mixer was run for 30 minutes, while maintaining a temperature of 78° to 106° F. maximum temperature at the end. There was then added to the mixer 15.1 pounds of glacial acetic acid and the mass was cooled to 90° F. Then 15.1 pounds of acetic acid were added to the mixer, and the mass was cooled to 90° F. A mixture of 17.2 cc. of $H_2SO_4$ (93.8%) and 300 grams of glacial acetic acid was added to the mixer, and the temperature of the mass was reduced to 66° F. Thereupon 19.6 pounds of 97% acetic anhydride at a temperature of 30° F. were added to the mixer and the temperature of the esterification bath was maintained at 70° F. for 15 minutes and then cooled to 50° F. A mixture of 111.5 cc. of $H_2SO_4$ (93.8%) and 360 grams of glacial acetic acid was added to the mixer and the reaction temperature was allowed to rise to a maximum of 93° F. over a period of 2¼ hours.

The esterification was now complete and the cellulose had all dissolved in the esterification mixture. The jacket temperature of the mixer was raised to 185° F. and 160 grams of magnesium carbonate were added to the esterification solution. 358 grams of distilled water was then introduced into the mixer in the form of steam over 15 minutes, raising the temperature of the mass to 143° F. Sixty grams of magnesium carbonate was then added to the mixer and stirring was continued for 15 minutes, and the temperature of the solution was raised to 160° F. 90 pounds of distilled water having a temperature of 180–190° F. were then added to the mixer over 30 minutes, and the temperature of the mass rose to 174° F. During the entire procedure from the beginning, the blade of the mixer was run. The high acetyl acetate had now precipitated from the mass. The precipitated product was transferred to a false-bottom stainless steel tank equipped with a felt-covered, slotted, stainless steel screen. The product was washed by means of 15 2-hour changes of distilled water, and was dried at 160° F. The following data was collected with reference to this product:

| | |
|---|---|
| 1st stage 2:1 tetrachloroethane : acetic acid viscosity at 25° C_____secs__ | 79 |
| Per cent acetic acid in precipitation liquid _____ | 40.8 |
| Screen test: | |
| On 10 mesh _____per cent__ | 4 |
| On 20 mesh _____do____ | 31 |
| On 30 mesh _____do____ | 17 |
| On 40 mesh _____do____ | 15 |
| On 50 mesh _____do____ | 13 |
| On 100 mesh _____do____ | 13 |
| Pass 100 mesh _____do____ | 7 |
| Acetyl content _____do____ | 43.8 |
| Viscosity, 10% methylene chloride:methyl alcohol 9:1 at 25° C_____cps__ | 6479 |
| Intrinsic viscosity in formic acid_____ | 2.99 |
| Sulfur content _____per cent__ | 0.003 |
| Ash content _____do____ | 0.02 |
| Melting point _____°C__ | 290 |
| Char point _____°C__ | 300 |
| Heat stability, 8 hours at 180° C_____ | Good |

*Example 2.*—308 grams of refined acetylation grade cotton linters containing 8 grams of water were loaded into a sigma blade mixer together with 1 gram of distilled water and 1200 grams of glacial acetic acid; then the mass was raised at 30 minutes to a maximum temperature of 106° F. There was then added a mixture consisting of 50 grams of acetic acid and 0.38 cc. of H₂SO₄ (93.8%). The mass was then cooled to 66° F. and 1511 grams of 78.8% acetic anhydride cooled to 20° F. was added. The reaction mass was cooled to 50° F. The reaction temperature was allowed to rise over 2½ hours to 125° F.

The reaction was complete in 2¾ hours, whereupon the jacket temperature was raised to 150° F. and a mixture of 105 grams of distilled water and 395 grams of acetic acid at a temperature of 180–190° F. was added to the reaction bath over 20 minutes to impart a temperature of 140° F. to the mass. 0.65 gram of magnesium carbonate was then added and the mass was stirred for 15 minutes. There was then added to the mass 4513 grams of distilled water having a temperature of 180–190° F. over 35 minutes, imparting a temperature of 148° F. The precipitation was thereby completed. The powder thus obtained was transferred to a stainless steel false-bottomed wash tank equipped with a felt-covered slotted stainless steel screen. The product was washed in 15 1-hour changes of distilled water and dried at 160° F. The product obtained had the following characteristics:

| | |
|---|---|
| 1st stage 2:1 tetrachloroethane : acetic acid viscosity at 25° C_____secs__ | 56 |
| Acetyl content _____per cent__ | 44.6 |
| Intrinsic viscosity in formic acid_____ | 2.52 |
| Sulfur content _____per cent__ | 0.016 |
| Viscosity 10% solution in methylene chloride : methyl alcohol 9:1 at 25° C___cps__ | 4091 |

*Example 3.*—7.25 pounds of acetylation-grade cotton linters containing 0.25 pound of water were placed in a sigma blade-type mixer together with 28 pounds of glacial acetic acid. The mixer was run for 30 minutes at 110° F. 15.1 pounds of glacial acetic acid were added to the mixer and the mass was cooled to 90° F. A mixture consisting of 17.2 cc. of sulfuric acid (93.7%) and 300 grams of glacial acetic acid was then added to the mixer and the temperature was reduced to 66° F.

19.6 pounds of acetic anhydride (97%) at a temperature of 35° F. was added to the mixer and the temperature was maintained at 66–72° F. for 15 minutes and then cooled to 50° F. A mixture consisting of 111.5 cc. of sulfuric acid and 360 grams of glacial acetic acid was added to the mass and the temperature of the mass was allowed to rise to 88° F. over a period of 1.5 hours. The cellulose completely dissolved in the reaction mass. When this had been accomplished, the jacket temperature of the mixer was raised to 180° F. and a mixture consisting of 690 grams of distilled water, 12.5 pounds of acetic acid, and 222 grams of magnesium carbonate was heated to 180–190° F. and added to the mixer over a period of 30 minutes. The temperature of the mass during this time rose from 80° F to 150° F.

28.5 pounds of the reaction mass was transferred to a turbo-type mixer and was heated to 170° F. 36.4 pounds of distilled water having a temperature of 180–190° F. were then added to the mixer over a period of 30 minutes. The temperature of the precipitated mass at the end of this time was 180° F. The precipitated cellulose acetate thus obtained was washed in successive changes of distilled water until free of acid and then dried. The product obtained was found to have the following characteristics:

| | |
|---|---|
| Acetyl content _____per cent__ | 43.9 |
| Intrinsic viscosity in formic acid at 25° C. _____ | 2.95 |
| Sulfur content _____per cent__ | 0.006 |
| Viscosity of a 10% solution in methylene chloride : methyl alcohol 9:1 at 25° C. _____cps__ | 7752 |
| Heat stability, 8 hours at 180° C. _____ | Good |

*Example 4.*—7.25 pounds of acetylation-grade cotton linters consisting of 7.0 pounds of bone-dry cellulose and 0.25 pound of water and 28 pounds of acetic acid were placed in a sigma blade mixer. The mixer was run for 30 minutes at 110° F. whereupon 15.1 pounds of acetic acid were added to the mixer and the temperature was reduced to 90° F. A mixture consisting of 17.2 cc. of sulfuric acid (93.8%) and 300 grams of acetic acid was added to the mixer and the temperature was reduced to 66° F.

19.6 pounds of acetic anhydride (97%) having a temperature of 34° F. were added to the mass and the temperature thereof was maintained at 66–68° F. for 15 minutes. The temperature was then reduced to 50° F. and a mixture consisting of 111.5 cc. of sulfuric acid and 360 grams of acetic acid was added to the mixer and the temperature of the mass was allowed to rise to 95° F. over a period of 1 hour and 50 minutes.

The cellulose all dissolved in the reaction mixture, whereupon the jacket temperature was raised to 185° F. and 160 grams of magnesium carbonate were added thereto. 358 grams of distilled water having a temperature of 180–200° F. was then injected into the mixer from an atomizer as a fine spray over a period of 20 minutes, during which time the temperature of the mass rose from 95° F. to 145° F. 65 grams of magnesium carbonate were then added to the mixer. The temperature of the mass was raised to 170° F. and 90 pounds of distilled water having a temperature of 180–190° F. were added to the mixer over a period of 60 minutes, during which time the temperature of the precipitated slurry rose to 180° F. The fine product which was obtained was washed in successive changes of distilled water until free from acid and then dried. The dry product showed the following properties:

Bulk factor_____lbs./cubic foot__ 28
Viscosity of 10% solution in methylene chloride: methyl alcohol 9:1 at 25° C._____cps__ 7682
Acetyl content_____per cent__ 43.6
Ash content_____do____ 0.012
Sulfur content_____do____ 0.002
Heat stability, 8 hours at 180° C._____ Good
Intrinsic viscosity in formic acid at 25° C.__ 3.01

In all of the examples given above, the agitating element in the mixer is run continuously from the time the cellulose is initially introduced therein until the mass is removed therefrom. In the descriptions given, the term "glacial point" is to be understood to mean substantially the point at which neither water nor acetic anhydride is present. In converting the acetic anhydride to acetic acid in procedures in accordance with my invention, sufficient excess water can be added to take the mass beyond the glacial point providing the amount of water present is not in excess of 3% of the acid content of the bath to obtain the best results in accordance with my invention.

As regards the values given with reference to the various products, the values are obtained as follows:

*Viscosity in methylene dichloride-methanol solution*

One part of the cellulose ester, after drying two hours at 100° C., is dissolved in 9 parts of a mixture of methylene dichloride-methanol 90:10 by weight, and the mass is tumbled in a closed bottle until a uniform solution is obtained. The viscosity of this solution in centipoises at 25° C. is determined by the ball-drop method using the test-tube viscometer described by Malm, Genung, and Lapham (Analytical Chemistry 22, 658 (1950)).

*Acetic acid-tetrachloroethane viscosity*

20 grams of the completed esterification mass was placed in a small beaker, and 20 cc. of a mixture of equal parts by volume of acetic acid and tetrachloroethane was added thereto. The addition should take place slowly at first, the solvent being thoroughly mixed with the mass. As the mass becomes thinner, the solvent may be added more rapidly. The solution is then placed in a test tube and placed in a 25° C. bath. After the solution has remained long enough to attain the temperature of 25° C., the viscosity thereof is taken by the ball-drop method. After a short interval another viscosity determination is run. The two values should check, or the test tube should be again placed in the 25° C. bath until a check determination is obtained corresponding to that originally taken.

*Intrinsic viscosity in formic acid*

A 0.25 gram dry sample of the cellulose acetate is dissolved in 100 ml. of 98–100% formic acid at 25° C. The relative viscosity of the solution is measured in an apparatus as described by R. H. Wagner (Analytical Chemistry 20, 151–5, 1948), and the intrinsic viscosity is then calculated in accordance with the following formula:

$$[\eta] = \frac{2.3 \log \text{rel. vis}}{0.25}$$

*Heat stability*

The heat stability was determined by packing a 18 x 150 mm. test tube with a sample of the cellulose acetate to be tested and then heating the tube for 8 hours at approximately 180° C. in a metal block. After this treatment the color is then examined and if there has been little or no change in color it is considered that the heat stability of the material is good. If, on the other hand, a darkened condition is obtained, it is an indication that the heat stability of the sample leaves something to be desired and is rated poor.

The term "basic magnesium compound" as used herein is to be understood as referring either to the oxide or hydroxide of magnesium or to its salts with weak acids as represented by magnesium carbonate, magnesium acetate and the like. Any compound of magnesium which gives an acetic acid solution of magnesium acetate when the compound is mixed with acetic acid will be suitable for use in procedures in accordance with my invention.

The products in accordance with my invention are especially useful in any connection in which the cellulose ester will be subjected to elevated temperatures when in dry condition, such as in fabrics, motion picture film, and the like. However, due to the good stability and the ease of dissolving this product, it is useful generally in the various applications in which cellulose acetates are employed at the present time.

I claim:

1. In a process for the manufacture of cellulose acetate having an acetyl content of at least 42% in which cellulose is esterified with acetic anhydride and a sulfuric acid catalyst and the completed esterification mixture has a temperature of 80°–120° F., the steps of converting the acetic anhydride present in the completed esterification mass to acetic acid by adding thereto an aqueous fluid in an amount which brings the mass to, but not substantially beyond, the glacial point, while raising the temperature thereof to 140°–190° F., neutralizing the sulfuric acid of the mass with a basic magnesium compound in such manner that the completion of that neutralization is at the 140°–190° F. temperature induced when the mass was brought to the glacial point, and finally precipitating the cellulose acetate from the mass by substantially uniformly adding water having a temperature of 180°–212° F. over a period of 30–120 minutes to the agitated mass in an amount which will lower the acetic acid concentration thereof to 33–50% while maintaining the elevated temperature, whereby the cellulose acetate is precipitated in a fine particle form.

2. In a process for the manufacture of cellulose acetate having an acetyl content of at least 42% in which cellulose is esterified with acetic anhydride and a sulfuric acid catalyst and the completed esterification mixture has a temperature of 80°–120° F., the steps of neutralizing only so much of the catalyst in the completed esterification mass with a basic magnesium compound that .20–1.75 parts of free sulfuric acid per 100 parts of original cellulose remain, adding an aqueous fluid thereto in an amount which will bring the mass to, but not substantially beyond, the glacial point and elevating the temperature of the mass to 140–190° F., completing the neutralization of the catalyst with basic magnesium compound while maintaining this elevated temperature and finally precipitating the cellulose acetate from the mass by substantially uniformly adding an amount of water having a temperature of 180–212° F. to the agitated mass over a period of 30–120 minutes to lower the concentration of the acetic acid in the mass to 33–50% while maintaining the elevated temperature whereby the cellulose acetate is precipitated in a fine particle form.

3. In a process for the manufacture of cellulose acetate having an acetyl content of at least 42% in which cellulose is esterified with acetic anhydride and a sulfuric acid catalyst and the completed esterification mass has a temperature of 80–120° F., the steps of neutralizing only so much of the catalyst in the completed esterification mass with a basic magnesium compound that .20–1.75 parts of free sulfuric acid per 100 parts of original cellulose remains, subjecting the mass to the action of an amount of steam which brings it to, but not substantially beyond, the glacial point and raising the temperature of the mass to 140–190° F., adding an amount of basic magnesium compound to the mass to completely neutralize the sulfuric acid therein, while maintaining the 140–190° F. temperature and finally precipitating the cellulose acetate by substantially uniformly adding an amount of water of 180–212° F. to the agitated mass over 30–120 minutes which will lower the acetic acid concentration thereof to 33–50% while maintaining the elevated temperature whereby the cellulose acetate is precipitated in a fine particle form.

4. In a process for the manufacture of cellulose acetate having an acetyl content of at least 42% in which cellulose is esterified with acetic anhydride and a sulfuric acid catalyst and in which the temperature of the completed reaction mass is 80–120° F., the steps of neutralizing only so much of the sulfuric acid in the completed esterification mass with a basic magnesium compound that .20–1.75 parts of free sulfuric acid per 100 parts of original cellulose remains, adding to the mass aqueous acetic acid having a water content of 5–21% in a sufficient amount to bring the mass to, but not substantially beyond, the glacial point, and raising the temperature of the mass to 140–190° F., completely neutralizing the sulfuric acid present in the mass while maintaining this elevated temperature and finally precipitating the cellulose acetate therein by substantially uniformly adding water of 180–212° F. to the agitated mass over 30–120 minutes in a sufficient amount to lower the acetic acid concentration therein to 33–50% while maintaining the elevated temperature, whereby the cellulose acetate is precipitated in a fine particle form.

5. In a process for the manufacture of cellulose acetate having an acetyl content of at least 42% in which cellulose is esterified with acetic anhydride and a sulfuric acid catalyst and the temperature of the completed esterification mixture is 80–120° F., the steps of adding to the mass a mixture heated to 180°–190° F. of aqueous acetic acid containing 5–21% of water in an amount to bring the mass to, but not substantially beyond, the glacial point and a basic magnesium compound in an amount sufficient to completely neutralize the sulfuric acid in the mass, accompanied by elevation of the temperature of the mass to 140–190° F., and then precipitating the cellulose acetate from the mass by substantially uniformly adding water having a temperature of 180–212° F. to the agitated mass over a period of 30–120 minutes in sufficient amount to lower its acetic acid concentration to 33–50% while maintaining the elevated temperature, whereby the cellulose acetate is precipitated in a fine particle form.

6. In a process for the manufacture of cellulose acetate having an acetyl content of at least 42% in which cellulose is esterified with acetic anhydride and a sulfuric acid catalyst in an amount not more than .20–1.75 parts thereof figured as 100% $H_2SO_4$ per 100 parts of the original cellulose, and the completed esterification mixture has a temperature of 80–120° F., the steps of converting the acetic anhydride present in the completed esterification mass to acetic acid by adding thereto an aqueous fluid in an amount which brings the mass to, but not substantially beyond, the glacial point, while raising the temperature thereof to 140–190° F., neutralizing the sulfuric acid of the mass with a basic magnesium compound at the 140–190° F. temperature and finally precipitating the cellulose acetate from the mass by substantially uniformly adding water having a temperature of 180–212° F. over a period of 30–120 minutes to the agitated mass in an amount which will lower the acetic acid concentration thereof to 33–50% while maintaining the elevated temperature, whereby the cellulose acetate is precipitated in a fine particle form.

7. In a process for the manufacture of cellulose acetate having an acetyl content of at least 42% in which cellulose is esterified with acetic anhydride and a sulfuric acid catalyst and the completed esterification mixture has a temperature of 80–120° F., the steps of converting the acetic anhydride present in the completed esterification mass to acetic acid by adding thereto an aqueous fluid in an amount which brings the mass to but not substantially beyond the glacial point, while raising the temperature thereof to 140°–190° F., neutralizing the sulfuric acid of the mass with magnesium carbonate in such manner that .20–1.75 parts of sulfuric acid per 100 parts of original cellulose is neutralized at the 140–190° F. temperature, and finally precipitating the cellulose acetate from the mass by substantially uniformly adding water having a temperature of 180–190° F. over a period of 30–120 minutes to the agitated mass in an amount which will lower the acetic acid concentration thereof to 33–50% while maintaining the elevated temperature, whereby the cellulose acetate is precipitated in a fine particle form.

CARLTON L. CRANE.

REFERENCES CITED

The following references are of record in the file of this patent:

UNITED STATES PATENTS

| Number | Name | Date |
| --- | --- | --- |
| 2,469,395 | Malm et al. | May 10, 1949 |